(12) United States Patent
Kikuchi et al.

(10) Patent No.: US 6,210,462 B1
(45) Date of Patent: Apr. 3, 2001

(54) METHOD AND APPARATUS FOR MAKING METALLIC IRON

(75) Inventors: Shoichi Kikuchi; Akira Uragami; Isao Kobayashi; Yasuhiro Tanigaki; Eiichi Ito; Koji Tokuda, all of Osaka; Osamu Tsuchiya, Kobe; Shuzo Ito, Osaka, all of (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/176,311

(22) Filed: Oct. 22, 1998

(30) Foreign Application Priority Data

Oct. 23, 1997  (JP) .................................................. 9-291378

(51) Int. Cl.$^7$ .................................................. C21B 11/08
(52) U.S. Cl. .................................................. 75/485; 75/500
(58) Field of Search ........................... 75/484, 485, 755, 75/756, 500

(56) References Cited

U.S. PATENT DOCUMENTS

| 3,947,621 | 3/1976 | Collin et al. . |
| 4,597,564 | * 7/1986 | Hanewald et al. .................... 266/280 |
| 5,972,066 | * 10/1999 | Lehtinen ................................. 75/484 |

OTHER PUBLICATIONS

Patent Abstracts of Japan, vol. 018, No. 668 (C–1289), Dec. 16, 1994, JP 6–264155, Sep. 20, 1994.

* cited by examiner

*Primary Examiner*—Melvyn Andrews
(74) *Attorney, Agent, or Firm*—Oblon, Spivak, McClelland, Maier & Neustadt, P.C.

(57) ABSTRACT

A method of making metallic iron includes heating a mixed powder containing iron oxide and a carbonaceous reducing agent on a hearth to reduce the iron oxide and melt the reduced iron. Preliminary molding of the mixed powder starting material into pellets is not required. The resulting metallic iron contains extremely low concentrations of slag ingredients, even when the mixed powder starting material contains only low concentrations of iron oxide.

15 Claims, 6 Drawing Sheets

METHOD AND APPARATUS FOR MAKING METALLIC IRON

BACKGROUND OF THE INVENTION

1. Field of the Invention

The present invention relates to methods for obtaining metallic iron by the reduction of iron oxides, such as iron ores, together with carbonaceous reducing agents. In particular, the present invention relates to a method and an apparatus for producing high purity metallic iron by efficiently separating slag ingredients from raw materials containing iron oxides.

2. Description of Related Art

Conventional methods of making iron by direct reduction of iron oxides in iron ores or iron oxide pellets using a carbon material or a reducing gas include the shaft furnace method typically represented by the Midrex method. This direct iron making method comprises blowing a reducing gas, produced from, e.g., natural gas, from a tuyere at the bottom of a shaft furnace to reduce iron oxides and obtain reduced iron. More recently, methods of making reduced iron using carbon material such as coal as a reducing agent instead of natural gas, such as the SL/RN method, have been put into practical use.

U.S. Pat. No. 3,443,931 discloses another method of making reduced iron in which powders of a carbon material and iron oxides are mixed and formed into pellets prior to reduction on a rotary hearth.

Reduced iron made by these conventional methods can be charged, either directly or after being formed into pellets or briquettes, into an electric furnace and used as an iron source.

As recycling of iron scraps has developed in recent years, it has been noted that the reduced iron obtained by the methods described above can act as a diluent for impurity elements present in the scraps.

However, because conventional methods of making reduced iron fail to remove large amounts of slag ingredients such as $SiO_2$, $Al_2O_3$ and CaO that are present in iron oxide and carbon material starting materials (e.g., gangue in iron ores, ashes in the coal), the metallic iron produced is of lower iron quality (i.e. lower purity).

In practice, slag ingredients are separated and removed from metallic iron in later refining steps. However, the presence of large amounts of slag in reduced iron not only lowers the yield of refined molten metal but also raises the cost of operation of the electric furnace.

As a result, a demand has developed for reduced iron of high iron quality containing fewer slag ingredients. However, in order for conventional reduced iron making methods to satisfy the demand, iron ores of high iron quality have to be used as the starting material for making the reduced iron. In practice, this has greatly narrowed the range of iron oxide starting materials that can be used to make iron.

In the conventional methods described above, it is necessary to mix the iron oxide source and the carbon material, and to mold the mixture preliminarily into lumps or pellets using a binder or by sintering. This preliminary molding inevitably increases the burden on the facility and operation.

Japanese Patent Laid-Open Hei 9-256017, filed by the present applicant, discloses a method comprising preliminarily molding a mixed powder of a carbonaceous reducing agent and iron oxide into a spherical or pellet-shaped molded product; heat reducing the molded product to form and grow a metallic iron shell on the outer surface of the molded product; and increasing the reduction potential in the metallic iron shell. The method is capable of efficiently reducing the iron oxide on the inside of the molded product, separating the resulting metallic iron and slag, and making high purity metallic iron.

However, even in this method the starting mixture has to be preliminarily molded into a spherical or pellet shape using a binder or by sintering, increasing the burden on the facility and the operation.

Japanese Patent Laid-Open Hei 8-27507 discloses another direct reduction method of making iron that includes stacking layers of powdery iron oxide and a carbonaceous reducing powder such as coal containing a desulfurizer on a movable hearth and heating the layers to form a sponge iron. The reference emphasizes that since the iron oxide is reduced by the carbonaceous reducing agent, and sulfur ingredients contained in the carbonaceous reducing agent are captured by the desulfurizer, sponge iron with less sulfur content can be obtained according to the method and subsequent desulfurizing loads can be moderated.

While this method does not require preliminarily molding iron oxide starting material into pellets, the reduction efficiency of the method is low because the iron oxide source and the carbonaceous reducing agent are not in direct contact with each other. Thus, long periods of time are required for heat reduction. Because of low productivity, the method is not practical for use on an industrial scale.

In addition, because the method produces reduced iron in the form of sponge iron, and a large amount of gangue ingredients are present in sponge iron, the quality of the reduced iron is relatively low. If reduced iron of such low iron quality is supplied as an iron source to an electric furnace, undesirable effects on the operability of the electric furnace result from the increase in the amount of slag that forms. In addition, various other problems result such as a reduction in iron yield due to the loss of iron into the slag, an increase in energy consumption, and a decrease in productivity. Since these problems become more pronounced as the iron content in an iron oxide source is decreased, it is almost impossible to use an iron or iron oxide source of low quality as a starting material in practice. Instead, only an iron oxide source of high quality can be used.

The present invention has been accomplished in view of the foregoing problems in the prior art.

An object of the present invention is to provide a method and an apparatus capable of making reduced iron of high Fe purity, containing relatively small amounts of slag ingredients, from iron oxide sources of both high and low quality without requiring preliminary molding of starting materials into lumps or pellets.

SUMMARY OF THE INVENTION

The present invention provides a method of making metallic iron that includes laying on a hearth a mixed powder comprising a powder containing iron oxide and a powder containing a carbonaceous reducing agent; heating the mixed powder; reducing the iron oxide; and melting the reduced iron, without initially molding the mixed powder into a pellet or other shape.

In a preferred embodiment, the mixed powder laid on the hearth is pressed into a compact state before heating. When the compacted mixed powder is heated, the iron oxide and the carbonaceous reducing agent are in intimate contact with each other to increase the efficiency of the thermal reduction.

In another embodiment, the mixed powder is formed in an uneven layer on the hearth in order to increase the surface area of the layer. When the layer is heated, the relatively large effective heating area of the uneven surface of the mixed powder leads to an increase in efficiency of the thermal reduction.

In a further embodiment, a product release promotion layer is formed on the hearth prior to laying the mixed powder on the hearth. When mixed powder laid on the hearth is thermally reduced and melted as described above, molten reduced iron of high specific gravity may come into direct contact with the hearth surface and thermally degrade refractories on the floor of the hearth. In addition, reduced iron deposited on the surface of the hearth may hinder the discharge of product (i.e., reduced iron and slag) from the hearth. The product release promotion layer helps to protect the hearth surface from thermal degradation and prevents reduced iron deposits from forming on the hearth surface. As a result, the product release promotion layer facilitates the discharge of product from the hearth and extends the working life of the hearth.

In a further preferred embodiment, the mixed powder contains a desulfurizer. The desulfurizer captures sulfur formed during the thermal reduction and melting, and reduces the sulfur content of the reduced iron product.

The present invention also provides an apparatus for making metallic iron that comprises: a movable hearth, a supply mechanism for supplying on the hearth a mixed powder comprising a powder containing iron oxide and a powder containing a carbonaceous reducing agent, a heating mechanism for heating the mixed powder on the hearth, a discharge mechanism for discharging the reduced and melted product from the hearth, and a separation mechanism for separating the product into reduced iron and slag.

In a preferred embodiment, the apparatus comprises a pressing mechanism for pressing the mixed powder laid on the hearth.

In another preferred embodiment, the apparatus comprises an unevenness forming mechanism for making the surface of the mixed powder layer uneven.

In a further embodiment, this apparatus comprises a product release promotion layer forming mechanism for depositing a product release promotion layer on the hearth.

In other embodiments, the apparatus includes either a hearth comprising a plurality of hearth units moving along a closed loop, a hearth comprising a plurality of reciprocating hearth units, or a rotational disk-shaped hearth.

In a preferred embodiment, the hearth comprises a plurality of hearth units rotating coaxially on the inside of a horizontally placed cylindrical refractory furnace.

In these embodiments, in order to practice the invention on an industrial scale the series of steps of supplying the starting powder mixture through the thermal reduction, melting and discharging of the products can be continuous.

As described above, in the iron making method of the present invention a mixed powder comprising a powder containing iron oxide and a powder containing a carbonaceous reducing agent (hereinafter sometimes referred to as a carbon material) is laid on the surface of a hearth, thermally reduced and melted to obtain metallic iron. Since the iron oxide source and the carbon material are used as a mixed powder, conventional preliminary molding of the mixed powder to form lumps or pellets is not required. In addition, since the iron oxide source and the carbon material are adjacent to each other in a mixed state during the reduction, the reduction proceeds efficiently in a relatively short period of time. Furthermore, since the melting of the thermally reduced iron fuses and agglomerates reduced iron together while expelling slag ingredients, high purity reduced iron with extremely low concentrations of slag ingredients can be obtained, even when an iron oxide source of low quality is used.

DESCRIPTION OF PREFERRED EMBODIMENTS

The method and apparatus for making metallic iron according to the present invention will be explained more specifically with reference to FIGS. 1–10. However, the invention is not restricted to the illustrated embodiments and may be practiced by appropriate design change coming within the ordinary skill in the art.

Figure 1:
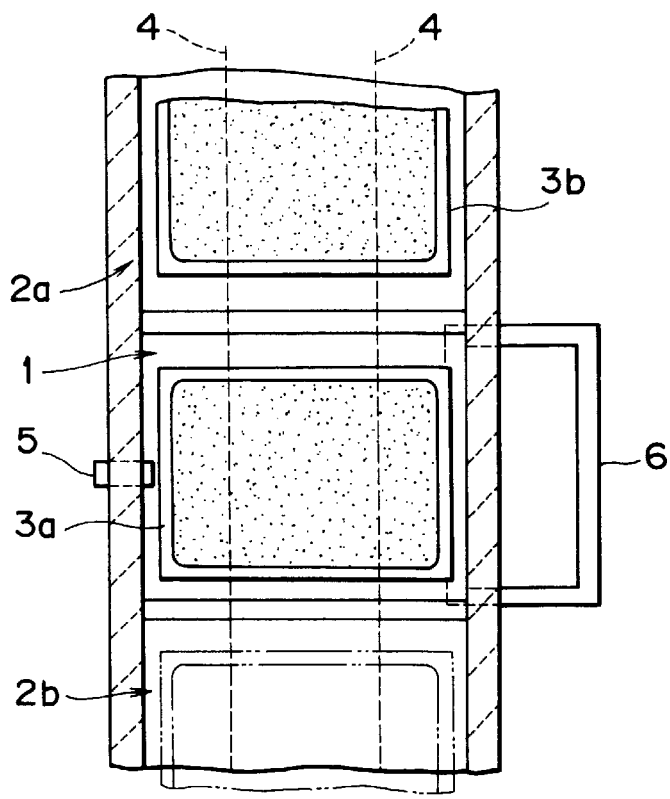
FIG. 1 is an plan view of a portion of an apparatus illustrating a preferred embodiment of the present invention.
Figure 2:
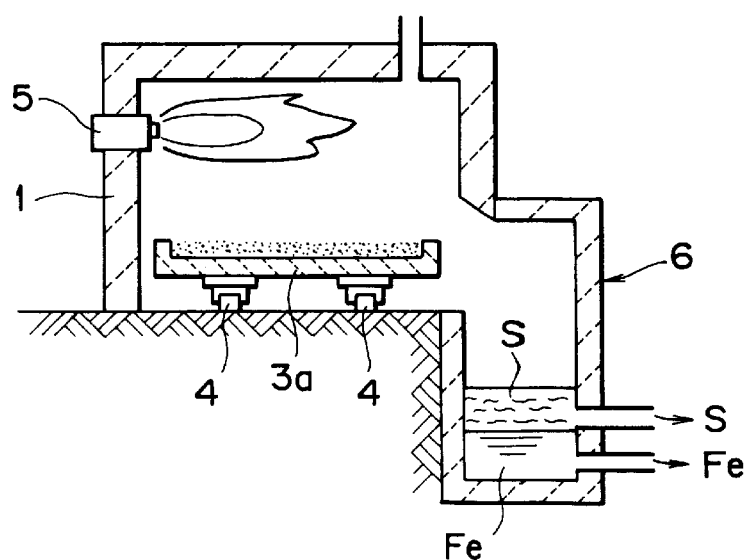
FIG. 2 is a transverse cross sectional view of the apparatus shown in FIG. 1.

FIG. 1 and FIG. 2 illustrate an apparatus for making metallic iron according to the present invention. FIG. 1 is a schematic plan view with an opened ceiling portion. FIG. 2 is a schematic transverse cross sectional view of FIG. 1. In the drawings are shown a heating furnace 1; starting material supply sections 2a, 2b; hearth units 3a, 3b ; rails 4 for moving the hearth units; a burner 5 constituting a heating mechanism; and a melting and separation furnace 6 constituting a separating section.

In this embodiment, as shown in the drawings, pallet-like hearth units 3a, 3b reciprocate on the rails 4 in and out of the heating furnace 1 disposed between the starting material supply sections 2a, 2b. A mixed powder of an iron oxide source and a carbon material is supplied at a starting material supply portion 2a (or 2b) in the hearth unit 3a (or 3b) to an appropriate thickness. FIG. 1 shows a state of supplying a starting material mixed powder into the hearth unit 3b at the starting material supply portion 2a in an upper portion of the drawing and then moving the unit 3a to the heating furnace 1. The mixed powder layer may be pressed into a compact state, or further formed to have an uneven surface, depending on the case. The mixed powder layer is then moved into the heating furnace 1, where the mixed powder is heated by the burner 5 to promote reduction and melting.

The iron oxide source in the starting material mixed powder laid on the hearth unit 3a and sent into the heating furnace 1 receives heat from the burner 5, is reduced by the carbon material in the mixed powder and the carbon monoxide formed from the carbon material, and is further heated and melted while being carburized by the carbon content from the adjacent carbon material. In this process molten reduced iron particles adhere and agglomerate to each other while expelling by-products of slag ingredients. The agglomerated molten particles gradually grow into large lumps of molten reduced iron. The slag ingredients are segregated to the surface of the lumps of molten reduced iron, but do not substantially intrude to the inside of the molten iron.

After the reduction and melting is complete, the hearth unit 3a is tilted by an optional tilting device (not illustrated) toward the melting and separation furnace 6. The product is discharged from the hearth unit 3a to the melting and separation furnace 6, where it can be further heated to maintain or increase its fluidity. In the melting and separation furnace 6 the product separates into reduced iron Fe and slag S due to differences in specific gravity. Slag S is drawn from the surface portion of the melting and separation furnace 6. Metallic iron Fe is drawn from the bottom portion of the melting and separation furnace 6.

After discharging the product, the hearth unit 3a is moved to the starting material supply portion 2b shown in a lower portion of FIG. 1. At the same time, the hearth unit 3b filled with starting material at the starting material supply portion 2a is sent into the heating furnace 1, where the starting material mixed powder is heat reduced and melted in the same manner as described above. Meanwhile, starting material is supplied (optionally with pressing or formation of surface unevenness) to the other hearth unit in the starting material supply portion 2b shown in a lower portion of the drawing and is caused to stand-by for the next heat reduction and melting. Then, after discharging reduced product from the hearth unit 3b in the melting furnace 1, the hearth unit 3b is moved back to the upper portion of FIG. 1 outside of the heating furnace 1, while the hearth unit 3a on stand-by in the starting material supply portion 2b is sent into the starting furnace 1. By repeating these operations, the starting material mixed powder can be intermittently thermally reduced and melted in a continuous fashion.

Exhaust gases discharged from the heating furnace 1 contain considerable amounts of heat and combustible gases (carbon monoxide and the like). These exhaust gases can be economically recycled as the fuel for the burner 5. Alternatively, the exhaust gases can be used effectively as a heat source or fuel in other facilities.

The starting material mixed powder can be prepared by blending a carbon material in an amount greater than the theoretical amount required to reduce the iron oxides contained in an iron oxide source. Preferably, the amount of carbon material in the blend is controlled to be equal to the sum of the amount required to reduce the starting material iron oxide, the amount required to carburize the reduced iron, and the amount associated with oxidation loss. This amount of carbon material is desirable because, when reduced iron formed during the reduction is carburized in the reduction atmosphere, the melting point of the reduced iron is lowered to further facilitate separation from the slag ingredients.

The starting material mixed powder is laid on the hearth unit to an appropriate thickness. The thickness of the mixed powder layer is selected based on considerations of the constitution, scale and heating efficiency of the manufacturing apparatus. In order to rapidly heat the entire mixed powder layer and efficiently reduce and melt the iron oxide in the layer, the layer is preferably 10 to 300 mm, more preferably 20 to 100 mm, thick.

The starting material mixed powder may be laid so that its thickness is substantially identical over the entire surface on the hearth unit. Alternatively, the starting material mixed powder may be pressed and compacted using an optional pressing device, may be formed with an uneven surface to enlarge the effective heating area, or may be placed on the hearth unit at a plurality of spaced positions in appropriate shapes, such as a trapezoidal shape. The term "laid on the hearth" in the present invention also includes such placing arrangements.

While the starting material mixed powder laid on the hearth unit may be made uniform in the thickness using an appropriate leveling mechanism, it is more preferred to compress the powder into a compact state using, for example, by a press roller. In the pressed mixed powder the iron oxide and carbon material are brought into more intimate contact, leading to an increase in the reduction efficiency. Pressing into compact state means herein that the powder starting mixture is pressed and solidified while reducing the distance between particles in the starting material powder. This is essentially different, for example, from the prior art as described in Japanese Patent Laid-Open Hei 9-256017, where the powder is preliminarily molded into lumps or pellets by using a binder or by sintering.

The pressing treatment can be used to produce an uneven surface having an enlarged surface area. In this case, since heat from above can be efficiently transmitted to the inside of the mixed powder layer and release of $CO_2$ formed by the reducing reaction can also be accelerated, the reducing efficiency is further improved. There is no particular restriction on the topography of the uneven surface. The uneven surface can include linear, corrugated or lattice-like shapes. If the unevenness partitions the pressed layer to a lattice-like configuration of an appropriate size, metallic iron formed by reduction in each lattice is agglomerated into a molten lump and formed as a metallic iron lump of substantially uniform size, so that subsequent treatment (i.e., separation by sieving from the slag ingredient) can be easily standardized.

There is no particular restriction on the temperature during the reduction provided that the temperature is higher than the melting point of the metallic iron or its carbonization product. In order to efficiently proceed with the reduction while minimizing the thermal degradation of the lined refractories of the heating furnace 1 or the hearth unit, the temperature is preferably within a range from 1350 to 1550° C., and more preferably, from 1400 to 1500° C.

FIGS. 3–6 show another embodiment of the present invention where a plurality of hearth units 3 are arranged on a continuously rotating mechanism that moves the hearth units 3 along a track-like closed loop. As each hearth unit 3 moves around the track, the hearth unit 3 encounters in a continuous fashion the various operations discussed above (i.e., supplying starting material mixed powder→pressing→reduction and melting→product discharge).

Figure 3:
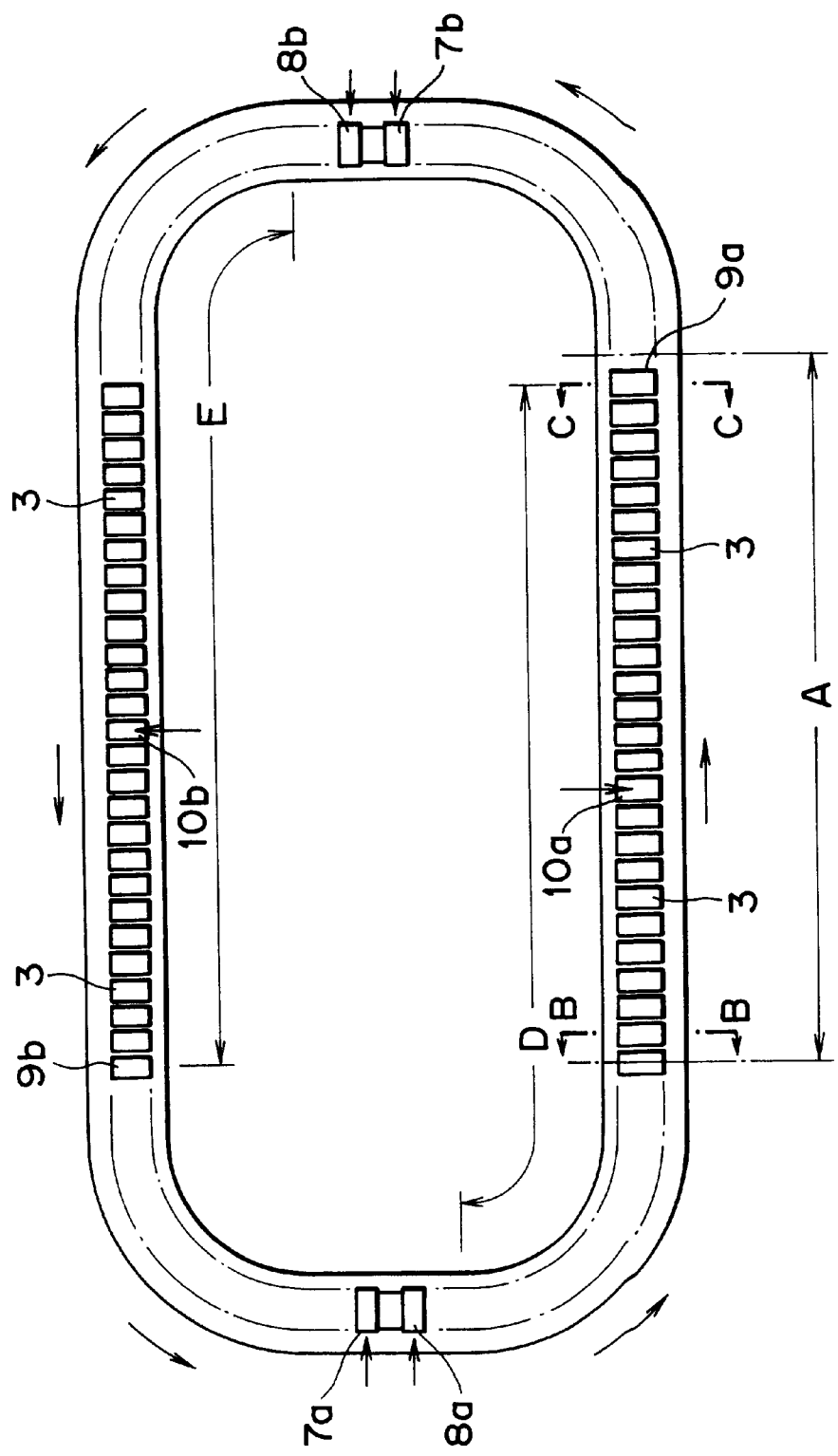
FIG. 3 is a schematic plan view of an apparatus illustrating another embodiment of the present invention.

Specifically, FIG. 3 shows starting material supply sections 7a, 7b; pressing sections 8a, 8b; thermal reduction zones D and E; and product discharging sections 9a, 9b arranged on a continuous track-shaped loop in which reduction and melting can be performed at two locations along the loop.

Figure 6:
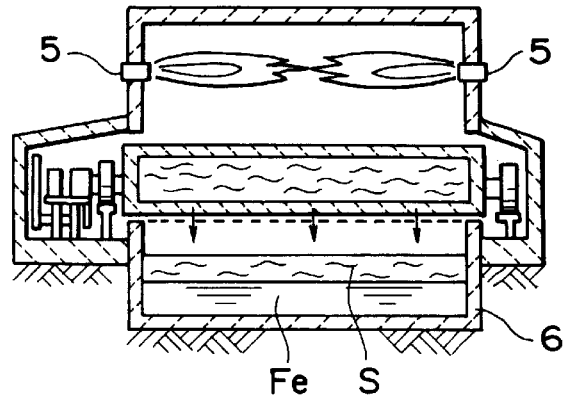
FIG. 6 is a schematic cross sectional view taken along line C—C in FIG. 3.

Starting material powder supplied on the hearth unit 3 at the starting material supply portions 7a, 7b is pressed into a compact state in the pressing sections 8a, 8b, then sent to the heating zones D, E, and receives heat from a heating mechanism such as a burner 5 in the regions D, E to promote reduction. After completing reduction and melting, the hearth pallet 3 arriving at the discharge portions 9a, 9b is tilted by an optional tilting device as shown in FIG. 4 and FIG. 6, to discharge the reducing and melting product into a melting and separation furnace 6 where reduced iron Fe and slag S are separated due to differences in specific gravity.

Figure 4:
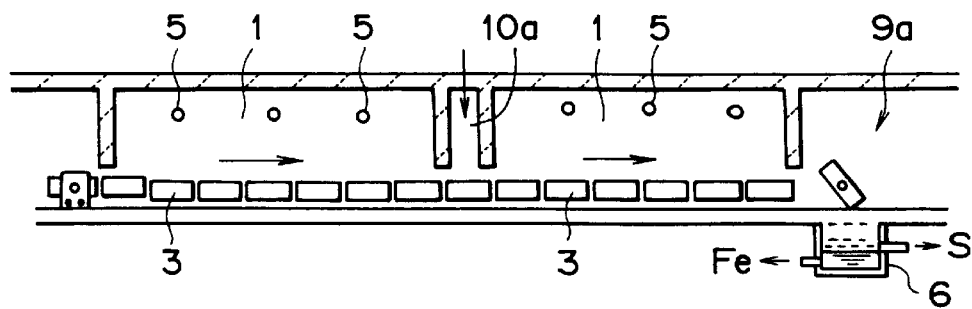
FIG. 4 is a schematic vertical cross sectional view showing, on an enlarged scale, a reduction and melting section and a separating section of the apparatus shown in FIG.
Figure 5:
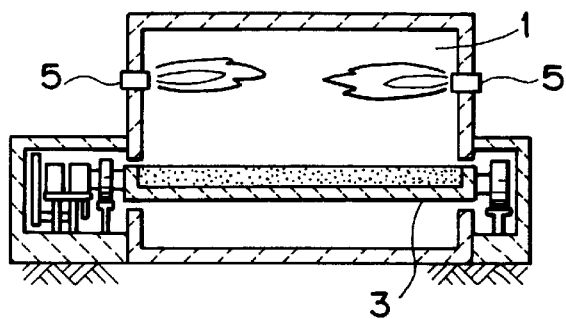
FIG. 5 is a schematic cross sectional view taken along line B—B in FIG. 3.

As shown in FIG. 3 and FIG. 4, secondary starting material supply portions 10a, 10b can each be disposed at an intermediate position of the heating zones D, E, so that a secondary source of starting material mixed powder can be supplied to the hearth units 3. This secondary source of starting material may be necessary because the burning of the carbon material and the reduction of the iron oxide during in the reduction and melting step can decrease the volume of the initial starting material to about ½–⅓, even if the initial starting material is compacted by pressing. Without the introduction of secondary starting material into the hearth units 3, fully effective processing performance cannot be realized in the latter half of the reduction. Accordingly, it is extremely effective for improving productivity to replenish the hearth units 3 with starting material mixed powder from the secondary supply portions 10a, 10b when the volume of the starting material mixed powder in the hearth units 3 has decreased during the reduction.

Figure 7:
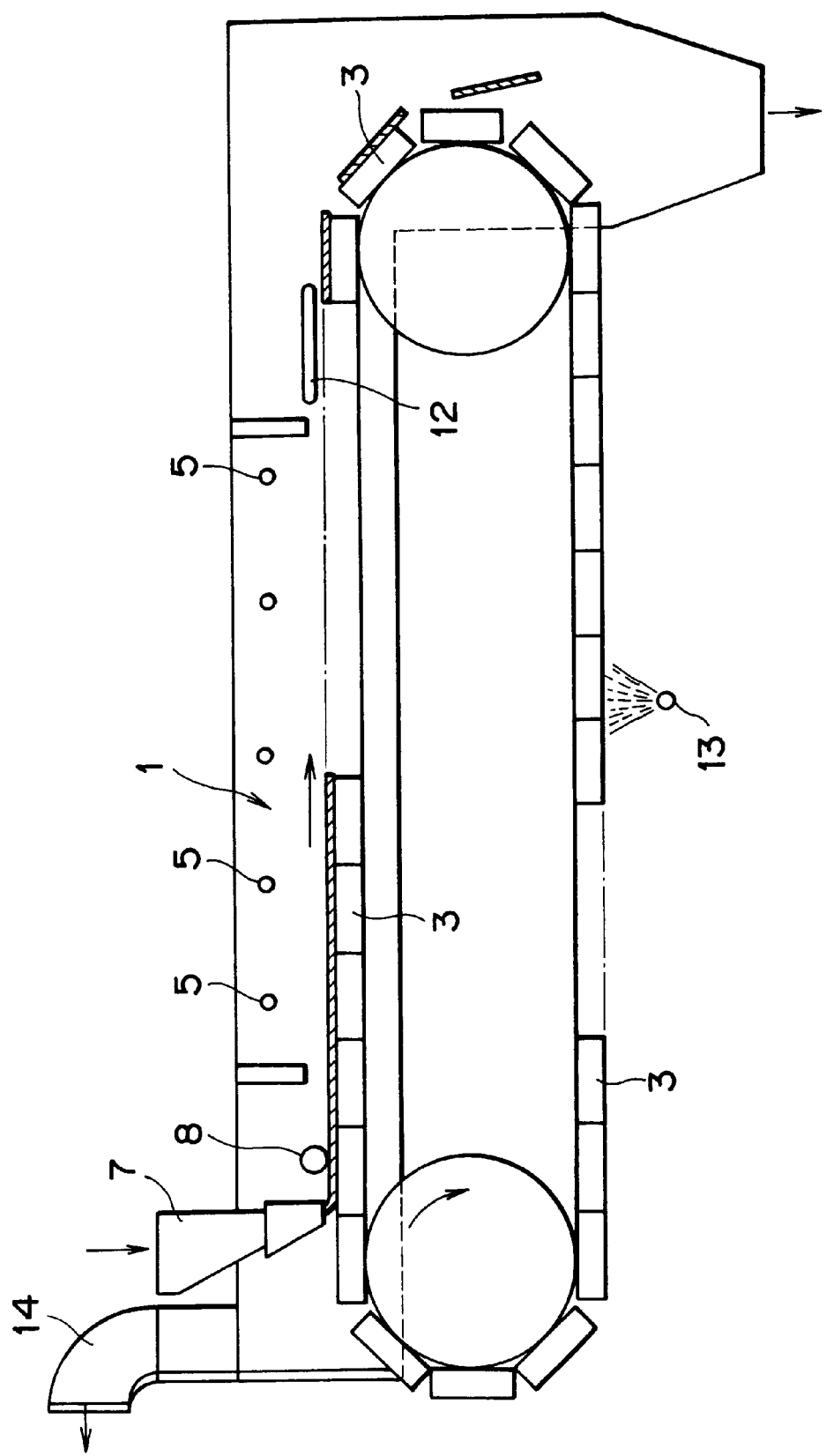
FIG. 7, FIG. 8 and FIG. 10 are schematic vertical cross sectional views illustrating further embodiments of the present invention.

FIG. 7 is a schematic vertical sectional view illustrating a further embodiment of the present invention in which a plurality of hearth units 3 are secured to a caterpillar type rotational driving device in which the various operations discussed above (i.e., supplying starting material mixed powder→pressing→reduction and melting→product discharge) can be practiced continuously along the closed loop. The starting material is supplied from a starting material supply portion 7 at the left end in the upper portion of the closed loop onto the hearth unit 3. The starting material powder then is pressed by a pressing roller 8 and optionally formed with unevenness before being heated in a heating section 1 having a heating mechanism such as burners 5, by which reduction and melting are promoted in the same maimer as described above. Then, the product is cooled by a cooling mechanism 12 disposed downstream from the heating section. When the product reaches the right end of FIG. 7, the hearth unit 3 is tilted and the product spontaneously peels off the hearth unit 3 and falls under its own weight. The falling product may be pulverized and then separated into metallic iron and slag, for example, by magnetic selection.

In practice, this method requires that the product separate easily from the hearth unit 3. To assure the separation, a product release promoter supply portion 13 is disposed in the lower portion of the closed loop and a product release promoter such as an MgO liquid suspension is deposited on a receiving surface of the hearth unit 3. The product release promoter facilitates peeling of the product from the surface of the hearth unit as described above. There is no particular restriction on the kind of the promoter that can be used so long as it preferably comprises a compound having a melting point higher than that of reduced iron or slag, or a compound that can increase the melting point of the slag. In view of the product release promoting effect and the cost, preferable product release promoters include metal oxides such as MgO, CaO, $Al_2O_3$ or composite oxides containing them. Deposition of the product release promoter on the surface of the hearth unit allows the product to be released from the hearth unit, as described above, while helping to extend the working life of the hearth unit by suppressing the thermal degradation of the surface of the hearth unit. In an alternative embodiment, the product release promoter can be deposited on the hearth units 3 in a powdery form before the starting material powder supply portion 7.

Also in the embodiment shown in FIG. 7, it is effective to recover exhaust gases discharged from the reduction and melting section through a duct 14 in order to use the thermal content of the exhaust gases or to use combustible gases contained in the exhaust gases as fuels.

Figure 8:
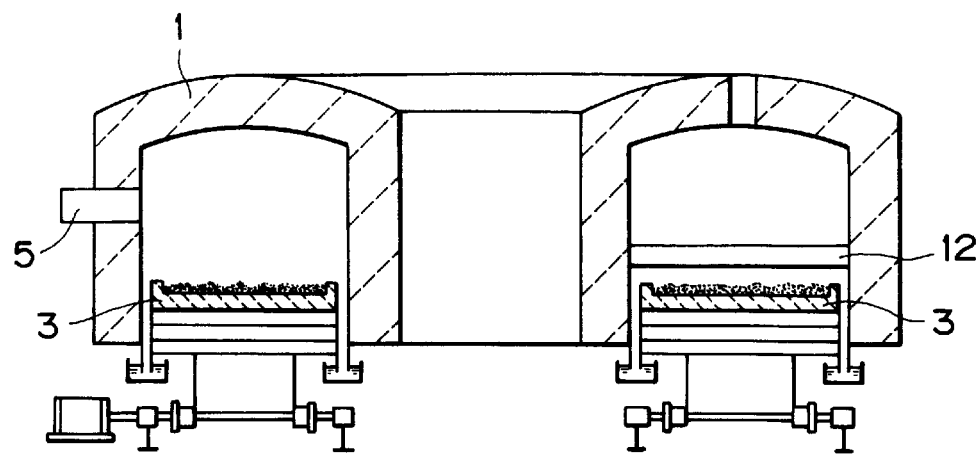
Figure 9:
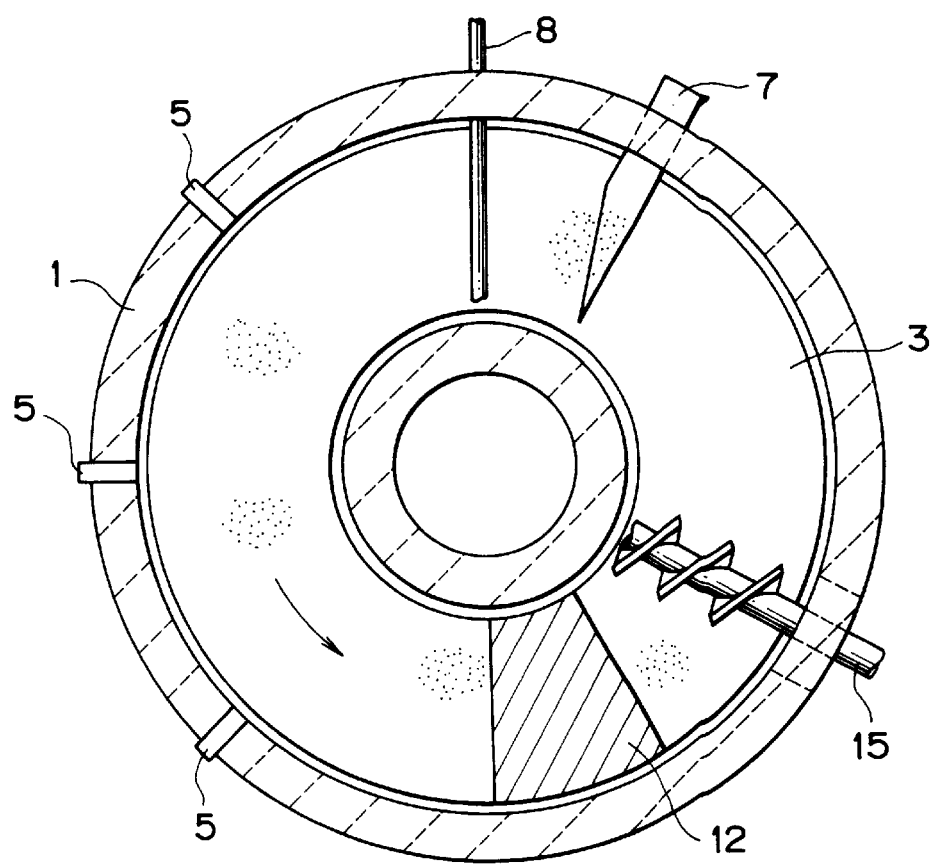
FIG. 9 is a schematic transverse cross sectional view of FIG. 8.

FIG. 8 and FIG. 9 are, respectively, a schematic vertical cross sectional view and a schematic transverse sectional view illustrating a further embodiment of the present invention, showing an apparatus for conducting reduction and melting on a disc-like hearth 3 rotating in a doughnut-shaped furnace 1. A starting material mixed powder is supplied from a starting material supply portion 7. The mixture is pressed by a pressing roller 8, and reduction and melting are promoted by the heat from burners 5. Then, after cooling the reduction product in a cooling zone 12, the product is discharged by a screw type discharging mechanism 15 disposed downstream. The screw type discharging mechanism 15 peels the product from the surface of the hearth 3, and the slag ingredients and the reduced iron are separated by a sieve or a magnetic selection device (not illustrated). In practice, it is effective to coat or spray a product release promoter just upstream of the starting material supply portion 7 to promote product release and to suppress thermal degradation of the hearth. It is also effective to form an uneven surface on the pressed layer using a portion of the pressing roller 8 to improve the reduction efficiency. In addition, hot exhaust gases from the heating portion can be recovered to increase process efficiency.

Figure 10:
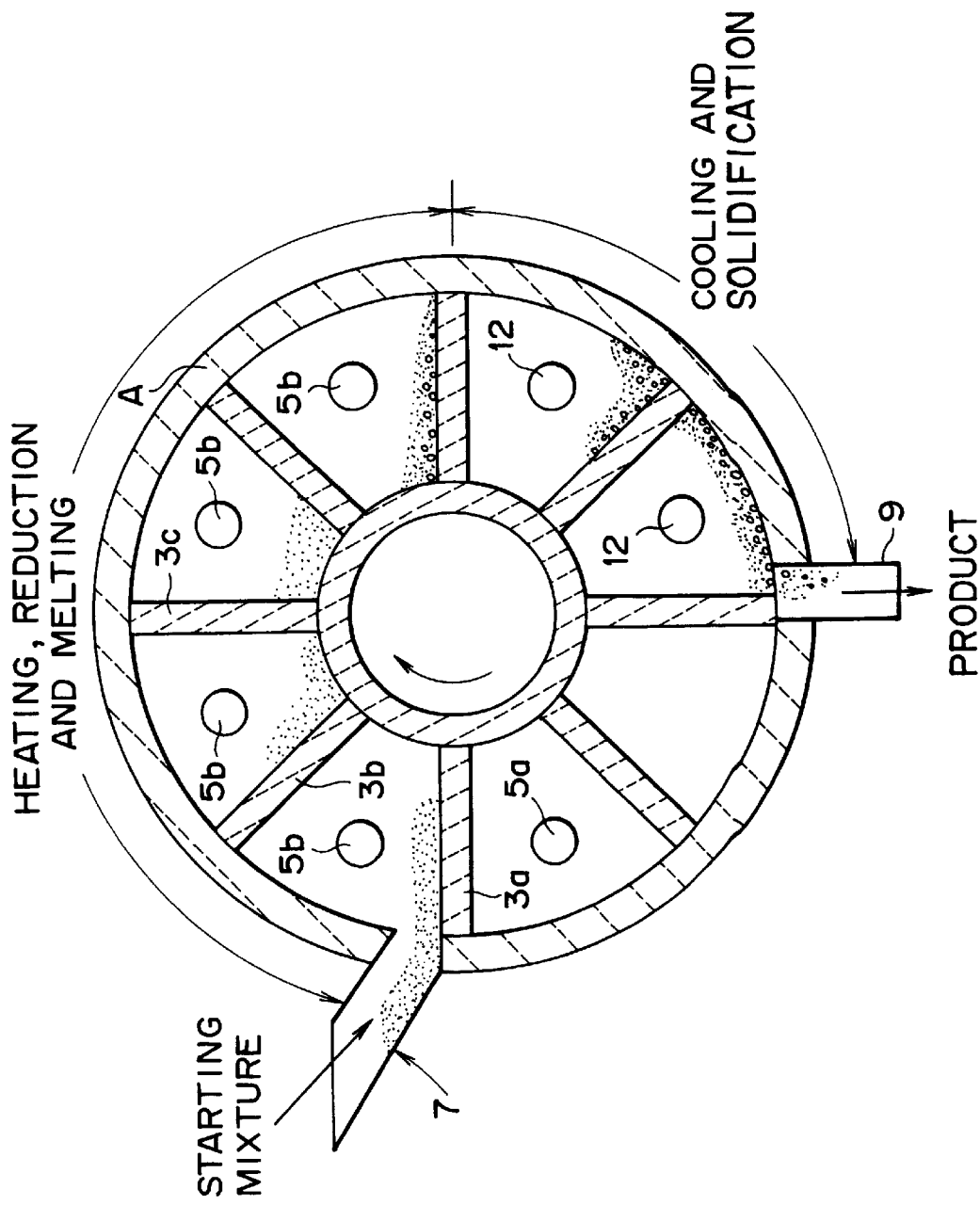

FIG. 10 is a schematic cross sectional view illustrating a further embodiment of the present invention comprising a plurality of hearth units 3a, 3b, 3c rotating around a horizontal axis in a cylindrical refractory furnace A, which optionally has a driving source along the inner circumferential wall. A starting material supply portion 7 and a product discharging portion 9 are disposed at optional positions of the refractory furnace A. A preheating burner 5a is disposed just before the starting material supply portion 7. Heating burners 5b, 5b are disposed downstream of the starting material supply portion 7 in the rotation direction. Blow cooling portions 12 are disposed downstream of the heating burners in the rotation direction.

When reduction and melting are conducted using the apparatus, a starting material mixed powder is charged from the starting material supply portion 7 into the furnace A until the hearth unit 3a preheated by a preheating burner 5a is rotated and reaches the starting material supply portion 7. The charged starting material mixed powder receives heat from the burner 5b while rotating on the hearth unit 3a. The mixed powder is reduced and separated into reduced iron and slag. Then, further downstream, cold gas from a blow cooling portion 12 is sent to cool and solidify the metallic iron and the slag formed by reduction and melting. The solidified metallic iron and slag are then discharged out of the furnace A from a product discharge portion 9. The discharged metallic iron and the slag ingredients can be separated by, for example, magnetic selection. The reduced iron can be manufactured by conducting the various operations described above (e.g., supplying starting material mixed powder→heat reduction and melting→cooling and solidification→discharging→separation of metallic iron) in a continuous fashion.

In addition to discharging the metallic iron and slag in solid form, it is also effective to replace the blow cooling portions with heating burners so that the metallic iron and slag are discharged from the discharge portion 9 in a molten state.

The method and the apparatus according to the present invention have been constituted, for example, as described above. The most prominent feature of the invention is to thermally reduce a powdered mixture of an iron oxide source and a carbonaceous reducing agent and to separate the resultant reduced iron in a molten state from slag ingredients while suppressing the intrusion of slag ingredients into the metallic iron. Reduced iron at high Fe purity is obtained. By the use of the method and the apparatus, reduced iron of extremely high Fe purity, for example, 95% or higher and, further, 98% or higher are obtained from both high and low quality sources of iron oxide. Accordingly, the present invention can effectively recover the Fe component even from wastes containing a small amount of iron oxides, such as, for example, the dust discharged from a blast furnace. It is also effective to improve the recovery rate of the Fe component by recycling the separated slag as starting material and further recovering the small amount of iron oxide mixed in the slag.

As the carbonaceous reducing agent used in admixture with the iron oxide source, a coal powder or coke powder is generally used. However, since a considerable amount of sulfur is contained in coal powder and coke powder, the concern may arise that a considerable amount of sulfur will be mixed in the reduced iron formed in the reduction step to increase the desulfurization load in the subsequent refining. However, when practicing the present invention, if a desulfurizer containing, for example, calcium carbonate, sodium carbonate, or calcium chloride is incorporated in an appropriate amount in the starting material mixed powder, so that the sulfur content formed in the reduction step can be captured by the desulfurizer and separated and removed together with the slag, it is possible to also reduce the sulfur content in the resulting reduced iron as low as possible.

EXAMPLES

The constitution as well as the function and the effect of the present invention will be explained more concretely with reference to the following examples. However, it should be noted that the present invention is not restricted by the examples specified below and can be practiced with appropriate modifications or changes within the ordinary skill in the art.

Example 1

An iron ore powder and a coal powder each of the following ingredient compositions were homogeneously mixed in the following ratio. The mixed powder (average grain size: 35 μm) was laid on a refractory tray at 100 mm□×40 mm thickness, and was charged in an electric furnace and heated at 1400° C. in a nitrogen gas atmosphere. The chancre in the mixed powder was observed through a view window.

As a result, reduction of the iron ores proceeded along with the elapse of time to form spots of molten reduced iron that combined to form agglomerates. After about 50 min, the molten agglomerates separated into a plurality of reduced iron lumps and slag in a molten state. Subsequently, reduced iron and slag were cooled, and the tray was taken out of the electric furnace, to obtain a plurality of metallic iron lumps with metallic gloss and black slag of the following ingredient compositions.

Starting Material Mixed Powder
  Iron Ore Powder Composition (wt %)
  T.Fe: 69.40%, FeO: 30.1%, $SiO_2$: 1.75%,
  $Al_2O_3$: 0.49%, CaO: 0.45%
  Coal Powder Composition (wt %)
  Fixed carbon: 68.5%, Volatile component: 21.4%, Ash: 10.1%,
  Iron Ore Powder: Coal powder=76.9%: 23.1%
Product Composition (wt %)
  Reduced Iron Lump
  T.Fe: 96.75%, FeO: 0.31%, M.Fe: 96.39%,
  Total carbon: 2.22%, Metallization: 99.63%
  Slag
  T.Fe: 5.15%, FeO: 0.56%, M.Fe: 4.58%,
  $SiO_2$: 44.63%, $Al_2O_3$: 19.18%, CaO: 10.38%

Example 2

A mixed powder formed by homogeneously mixing the same iron ore powder and the coal powder as used in Example 1 at an identical ratio (average grain size: 35 μm) was arranged and compacted in nine trapezoidal-shaped blocks (upper surface 20 mm□× lower surface 35 mm□×30 mm thickness) on a refractory tray. The mixed powder was then charged in an electric furnace and heated at 1400° C. in a nitrogen gas atmosphere and the change of the mixed powder was observed through a view window.

As a result, reduction of the iron ores proceeded along with the elapse of time to form spots of molten reduced iron that combined to form agglomerates on each of the nine blocks. After about 17 min, nine molten reduced iron lumps were formed. Subsequently, when the lumps were cooled and the tray was taken out of the electric furnace, nine lumps of metallic iron with metallic gloss and black slag of the following ingredient compositions were obtained.

Product Composition (wt %)
  Reduced Iron Lump
  T.Fe: 96.35%, FeO: 0.30%, M.Fe: 95.96%,
  Total carbon: 2.75%, Metallization: 99.59%
  Slag
  T.Fe: 10.66%, FeO: 2.37%, M.Fe: 8.57%,
  $SiO_2$: 49.42%, $Al_2O_3$:17.40%, CaO: 9.51%

As described above, according to the present invention reduced iron of high Fe purity can be obtained extremely simply and efficiently by reducing and melting a mixed powder of an iron oxide source and a carbonaceous reducing agent either directly or in a compacted state. Because the present invention does not require conventional preliminary molding to form a lump or pellets and the reduction reaction proceeds rapidly by bringing the iron source and the reducing agent into contact with each other, the reduction efficiency is extremely high. Furthermore, since the reduced iron adheres and agglomerates together in a molten state while expelling slag ingredients, reduced iron with lower concentrations of slag ingredients and of extremely high Fe purity can be obtained easily using iron oxide sources of both high and low quality. As a result, it is possible to effectively recover iron components from lower quality raw material, including, for example, dust discharged from blast furnaces, than has previously been considered possible in the industry.

Furthermore, the apparatus according to the present invention enables continuous direct iron making by a process, using a powdery starting material mixture, that can easily cope with mass production on an industrial scale.

What is claimed is:

1. A method of making metallic iron, the method comprising laying on a hearth a mixed powder containing iron oxide and a carbonaceous reducing agent;

pressing the mixed powder to form a layer of pressed mixed powder;

heating the pressed mixed powder;

reducing the iron oxide to form a reduced iron; and melting the reduced iron on the hearth to form the metallic iron and slag.

2. The method as defined in claim 1, wherein the pressing imparts an uneven surface texture to the layer of pressed mixed powder.

3. A method of making metallic iron, the method comprising depositing a product release promotion layer on a hearth then laying on the hearth a mixed powder containing iron oxide and a carbonaceous reducing agent;

heating the mixed powder;

reducing the iron oxide to form a reduced iron;

melting the reduced iron on the hearth to form the metallic iron and slag; and separating the metallic iron from the slag, wherein the melting includes forming molten iron and a molten slag; and the separating includes solidifying the molten iron and the molten slag to form an iron/slag product on the hearth, and releasing the product from the hearth.

4. The method as defined in claim 1, further comprising depositing a product release promotion layer on the hearth before laying the mixed powder on the hearth; and separating the metallic iron from the slag, wherein the melting includes forming molten iron and a molten slag; and the separating includes solidifying the molten iron and the molten slag to form an iron/slag product on the hearth, and releasing the product from the hearth.

5. The method as defined in claim 2, further comprising depositing a product release promotion layer on the hearth before laying the mixed powder on the hearth; and separating the metallic iron from the slag, wherein the melting includes forming molten iron and a molten slag; and the separating includes solidifying the molten iron and the molten slag to form an iron/slag product on the hearth, and releasing the product from the hearth.

6. The method as defined in claim 1, wherein the mixed powder further contains a desulfurizer.

7. The method as defined in claim 5, wherein the mixed powder further contains a desulfurizer.

8. The method as defined in claim 4, wherein the mixed powder further contains a desulfurizer.

9. The method as defined in claim 2, wherein the mixed powder further contains a desulfurizer.

10. The method as defined in claim 3, wherein the mixed powder further contains a desulfurizer.

11. A method of making metallic iron, the method comprising laying on a hearth a mixed powder containing iron oxide and a carbonaceous reducing agent;

heating the mixed powder;

reducing the iron oxide to form a reduced iron;

melting the reduced iron on the hearth to form the metallic iron and slag;

discharging the metallic iron and slag from the hearth to a furnace;

forming in the furnace a melt having a surface portion and a bottom portion, where the surface portion includes the slag and the bottom portion includes the metallic iron;

drawing the slag from the surface portion of the melt; and drawing the metallic iron from the bottom portion of the melt.

12. A method of making metallic iron, the method comprising laying on a hearth a mixed powder containing iron oxide and a carbonaceous reducing agent;

heating the mixed powder;

reducing the iron oxide to form a reduced iron;

melting the reduced iron on the hearth to form the metallic iron and slag; and separating the metallic iron from the slag, wherein the metallic iron is separated magnetically from the slag.

13. The method as defined in claim 3, wherein the product release promotion layer comprises a metal oxide selected from the group consisting of MgO, CaO, $Al_2O_3$ and composites thereof.

14. The method as defined in claim 4, wherein the product release promotion layer comprises a metal oxide selected from the group consisting of MgO, CaO, $Al_2O_3$ and composites thereof.

15. The method as defined in claim 5, wherein the product release promotion layer comprises a metal oxide selected from the group consisting of MgO, CaO, $Al_2O_3$ and composites thereof.

* * * * *